(12) United States Patent
Ma et al.

(10) Patent No.: US 12,077,070 B2
(45) Date of Patent: Sep. 3, 2024

(54) INFANT CAR SEAT AND STABILITY LEG AND RELEASE ACTUATOR

(71) Applicant: WONDERLAND SWITZERLAND AG, Steinhausen (CH)

(72) Inventors: Andrew Ma, Downingtown, PA (US); Kyle S. Mason, Lititz, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/601,118

(22) Filed: Mar. 11, 2024

(65) Prior Publication Data

US 2024/0208376 A1 Jun. 27, 2024

Related U.S. Application Data

(63) Continuation of application No. 18/317,228, filed on May 15, 2023, which is a continuation of application
(Continued)

(51) Int. Cl.
*B60N 2/28* (2006.01)

(52) U.S. Cl.
CPC .............. *B60N 2/2821* (2013.01); *B60N 2/28* (2013.01); *B60N 2/2824* (2013.01);
(Continued)

(58) Field of Classification Search
CPC .... B60N 2/2821; B60N 2/2824; B60N 2/289; B60N 2/2884; B60N 2/2893; B60N 2/286; B60N 2/2863; B60N 2/2848
See application file for complete search history.

(56) References Cited

U.S. PATENT DOCUMENTS

| 4,834,403 A | 5/1989 | Yanus et al. |
| 4,872,692 A | 10/1989 | Steenburg |

(Continued)

FOREIGN PATENT DOCUMENTS

| AU | 200235562 A1 | 10/2003 |
| CN | 202071722 U | 12/2011 |

(Continued)

OTHER PUBLICATIONS

Chinese First Office Action; Chinese Application No. 202010979091.3; Date: Jul. 5, 2022; 13 pages.
(Continued)

*Primary Examiner* — Syed A Islam
(74) *Attorney, Agent, or Firm* — CANTOR COLBURN LLP

(57) ABSTRACT

An infant car seat includes a seat base and a stability leg. The stability leg includes an upper leg tube, a middle leg tube, a lower leg tube, a rotary member, a first latch and a second latch. The middle leg tube includes at least one hole. The lower leg tube includes at least one opening. The rotary member is assembled with the seat base and affixed to the upper leg tube. The first latch is disposed on a bottom of the upper leg tube and adapted to detachably engage with the at least one hole for constraining a movement between the upper leg tube and the middle leg tube. The second latch is disposed on a bottom of the middle leg tube, and adapted to detachably engage with the at least one opening for constraining a movement between the middle leg tube and the lower leg tube.

14 Claims, 18 Drawing Sheets

Related U.S. Application Data

No. 17/023,413, filed on Sep. 17, 2020, now Pat. No. 11,691,543.

(60) Provisional application No. 63/009,677, filed on Apr. 14, 2020.

(52) U.S. Cl.
CPC ............ *B60N 2/2884* (2013.01); *B60N 2/289* (2013.01); *B60N 2/2893* (2013.01)

(56) References Cited

U.S. PATENT DOCUMENTS

| | | |
|---|---|---|
| 5,385,387 A | 1/1995 | Kain |
| 5,772,279 A | 6/1998 | Johnson, Jr. |
| 6,209,957 B1 | 4/2001 | Baloga et al. |
| 7,908,981 B2 | 3/2011 | Agee |
| 8,226,164 B2 | 7/2012 | Chen |
| 8,973,987 B2 | 3/2015 | Mo |
| 10,737,594 B2 | 8/2020 | Böhm et al. |
| 2007/0252067 A1 | 11/2007 | Lee |
| 2008/0030052 A1 | 2/2008 | Chen et al. |
| 2008/0303321 A1 | 12/2008 | Powell |
| 2019/0359092 A1 | 11/2019 | Harmes, V et al. |
| 2020/0016069 A1* | 1/2020 | Ross .................... A61K 9/0021 |
| 2021/0316642 A1 | 10/2021 | Ma et al. |
| 2022/0242281 A1 | 8/2022 | Ma et al. |
| 2023/0278471 A1 | 9/2023 | Ma et al. |
| 2024/0001818 A1 | 1/2024 | Ma et al. |

FOREIGN PATENT DOCUMENTS

| | | |
|---|---|---|
| CN | 102729855 A | 10/2012 |
| CN | 203237080 U | 10/2013 |
| CN | 104223847 A | 12/2014 |
| CN | 104875636 A | 9/2015 |
| CN | 109398174 A | 3/2019 |
| CN | 110395152 A | 10/2019 |
| DE | 202013103194 U1 | 10/2013 |
| EP | 1927502 A1 | 6/2008 |
| EP | 1930205 A2 | 6/2008 |
| EP | 2623368 A1 | 8/2013 |
| GB | 2490024 A | 10/2012 |
| GB | 2530375 A | 3/2016 |
| JP | 2016007933 A | 1/2016 |
| WO | 2019019502 A1 | 1/2019 |

OTHER PUBLICATIONS

Chinese Office Action for Chinese Application No. 202010982314.1; Report Mail Date Nov. 27, 2023 (pp. 1-26—with English translation).

Chinese Office Action with english translation for Chinese Application No. 202010982314.1; Report Mail Date Dec. 5, 2022 (pp. 1-31).

Chinese Office Action with English translation for Chinese Application No. 202010982314.1; Report Mail Date Jun. 26, 2023 (pp. 1-21).

European Application No. 20196670.2-1012 filed Sep. 17, 2020; European Search Report dated Feb. 25, 2021; 7 pages.

European Application No. 20196674.4-1012 filed Sep. 17, 2020; European Search Report dated Mar. 18, 2021; 24 pages.

European Application No. 22202114.9-1012 filed Sep. 17, 2020; European Search Report dated Mar. 6, 2023; 5 pages.

European Office Action for European Application No. 20196674.4; Report Mail Date Jun. 13, 2023 (6 Pages).

Extended European Search Report for European Application No. 22202114.9; Report Mail Date Mar. 6, 2023 (pp. 1-6).

U.S. Non-Final Office Action; U.S. Appl. No. 17/726.264; Mailing Date: Oct. 6, 2022; 13 pages.

U.S. Appl. No. 17/023,405, filed Sep. 17, 2020; Non-Final Office Action dated Oct. 8, 2021; 21 pages.

U.S. Appl. No. 17/023,413, filed Sep. 17, 2020; Non-Final Office Action dated Oct. 25, 2021; 16 pages.

Chinese Office Action for Chinese Application No. 202010982314.1; Report Mail Date Feb. 26, 2024 (pp. 1-14—with English translation).

European Office Action for European Application No. 22202114.9; Report Mail Date Feb. 19, 2024 (4 Pages).

Third-party observations submitted in European Application No. 22202114.9; Observations submitted Feb. 28, 2024 (4 Pages).

\* cited by examiner ion Ser. No. 18/317,228 filed May 15, 2023, which is a
INFANT CAR SEAT AND STABILITY LEG AND RELEASE ACTUATOR

CROSS REFERENCE TO RELATED APPLICATIONS

This application is a continuation of U.S. patent application Ser. No. 18/317,228 filed May 15, 2023, which is a continuation of U.S. patent application Ser. No. 17/023,413 filed Sep. 17, 2020, now Issued U.S. Pat. No. 11,691,543 issue date Jul. 4, 2023, which claims the benefit of U.S. provisional application No. 63/009,677 filed on Apr. 14, 2020. The disclosures of the prior applications are incorporated herein by reference herein in their entirety.

BACKGROUND OF THE INVENTION

1. Field of the Invention

The present invention relates to an infant car seat and a stability leg and a release actuator, and more particularly, to an infant car seat and a stability leg and a release actuator with an adjustable and easy-to-operation function.

2. Description of the Prior Art

An infant car seat is used to transport and protect infants in the vehicle. When the infant car seat is installed in the vehicle, a car seat base is secured to the vehicle via a latch belt or a vehicle belt, and the car seat base ensures the infant car seat is stably installed in the vehicle. The infant car seat further disposes a stability leg on the car seat base to protect the infants in the event of a vehicle collision. The car seat base is held against the floor of the vehicle via the stability leg, to prevent the car seat base from accidental rotation relative to the vehicle seat resulted from frontal collision. The conventional stability leg includes two leg tubes and one latch, and the latch constrains relative motion between the two leg tubes. Therefore, the conventional stability leg cannot provide multi-phase adjustment for the infant car seat.

SUMMARY OF THE INVENTION

The present invention provides an infant car seat and a stability leg and a release actuator with an adjustable and easy-to-operation function for solving above drawbacks.

According to the claimed invention, an infant car seat includes a seat base and a stability leg. The stability leg is rotatably disposed under the seat base. The stability leg includes an upper leg tube, a middle leg tube, a lower leg tube, a rotary member, a first latch and a second latch. The middle leg tube is slidably assembled with the upper leg tube, and includes at least one hole. The lower leg tube is slidably assembled with the middle leg tube, and includes at least one opening. The rotary member is assembled with the seat base in a rotatable manner and affixed to a top of the upper leg tube. The first latch is disposed on a bottom of the upper leg tube and adapted to detachably engage with the at least one hole for constraining a movement between the upper leg tube and the middle leg tube. The second latch is disposed on a bottom of the middle leg tube, and adapted to detachably engage with the at least one opening for constraining a movement between the middle leg tube and the lower leg tube.

According to the claimed invention, the seat base includes a support frame, and the rotary member further includes a contacting portion adapted to abut against the support frame for constraining a rotation of the stability leg relative to the seat base in an operation mode.

According to the claimed invention, the seat base includes a release actuator adapted to lock the stability leg for steadying the stability leg in a storage mode.

According to the claimed invention, the release actuator includes a handle portion and a locking portion connected to each other. The locking portion is engaged with or disengaged from the stability leg. The handle portion is movably disposed on the seat base and adapted to be applied by an external force for disengaging the locking portion from the stability leg.

According to the claimed invention, the release actuator further includes a hook portion disposed on the handle portion and slidably assembled with a slotted structure of the seat base.

According to the claimed invention, the handle portion includes a first connection segment, and the locking portion includes a second connection segment. The first connection segment is slidably connected to the second connection segment.

According to the claimed invention, the release actuator further includes a first resilient component disposed between the handle portion and the seat base, and further includes a second resilient component disposed between the locking portion and the seat base.

According to the claimed invention, the seat base includes a reclined foot. The release actuator is movably disposed inside the reclined foot. The locking portion is engaged with the stability leg when the handle portion is moved with rotation of the reclined foot via deformation of the first resilient component.

According to the claimed invention, the locking portion has a sunken structure adapted to be applied by an external force for disengaging the locking portion from the stability leg.

According to the claimed invention, the middle leg tube further includes a middle tube body and a first obstructer disposed on a bottom of the middle tube body. The lower leg tube further includes a lower tube body and a second obstructer disposed on a top of the lower tube body. The first obstructer contacts against the second obstructer to constrain relative motion between the middle leg tube and the lower leg tube.

According to the claimed invention, the first latch includes a first housing, a first lock and a first button. The first button is movably disposed on the first housing. The first lock is affixed to the first button and movably disposed inside the first housing for engaging with and disengaging from the at least one hole via motion of the first button.

According to the claimed invention, the first latch further includes a first recovering component disposed between the first housing and the first button.

According to the claimed invention, the first lock is disengaged from the at least one hole via pulling down on the middle leg tube or pressing the first button.

According to the claimed invention, the second latch includes a second housing, a second lock and a slider. The slider is slidably disposed inside the second housing. The second lock is affixed to the slider and slidably disposed inside the second housing for engaging with and disengaging from the at least one opening via motion of the slider.

According to the claimed invention, the second latch further includes a second recovering component disposed between the second housing and the slider.

According to the claimed invention, the second latch further includes a second button movably disposed on the second housing, and adapted to insert into the second housing for disengaging the second lock from the at least one opening.

According to the claimed invention, the second latch is disengaged in response to the second lock contacting against an inner wall of the middle leg tube.

According to the claimed invention, the stability leg further includes a first foot housing, a second foot housing, a first indication mark and a second indication mark. The first foot housing is disposed on a bottom of the lower leg tube, and has an encirclement portion. The second foot housing is connected with the first foot housing and adapted to expose the encirclement portion. The first indication mark is disposed on the encirclement portion. The second indication mark is movably disposed inside the second foot housing. The second indication mark has a first end and a second end opposite to each other. The second end is hidden inside the second foot housing in response to the first end protruding from at least one cavity of the second foot housing, and further reaches out the second foot housing in response to the first end pushed into the bottom of the second foot housing.

According to the claimed invention, the second indication mark is disposed inside the second foot housing in a slidable manner.

According to the claimed invention, an elastic component is disposed between the second indication mark and the first foot housing.

According to the claimed invention, a stability leg includes an upper leg tube, a middle leg tube, a lower leg tube, a rotary member, a first latch and a second latch. The middle leg tube is slidably assembled with the upper leg tube, and includes at least one hole. The lower leg tube is slidably assembled with the middle leg tube, and includes at least one opening. The rotary member is assembled with the seat base in a rotatable manner and affixed to a top of the upper leg tube. The first latch is disposed on a bottom of the upper leg tube and adapted to detachably engage with the at least one hole for constraining a movement between the upper leg tube and the middle leg tube. The second latch is disposed on a bottom of the middle leg tube, and adapted to detachably engage with the at least one opening for constraining a movement between the middle leg tube and the lower leg tube.

In the embodiment of the present invention, the stability leg has the upper leg tube, the middle leg tube and the lower leg tube slidably assembled with each other. The first latch is used to constrain the relative movement between the upper leg tube and the middle leg tube. The second latch is used to constrain the relative movement between the middle leg tube and the lower leg tube. The gross adjustment of the stability leg can lock the middle leg tube in accordance with the hole on the middle leg tube; the fine adjustment of the stability leg can lock the lower leg tube in the lower position via the opening on the lower leg tube, and further lock the lower leg tube in the upper position via the flexible protrusion of the foot housing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
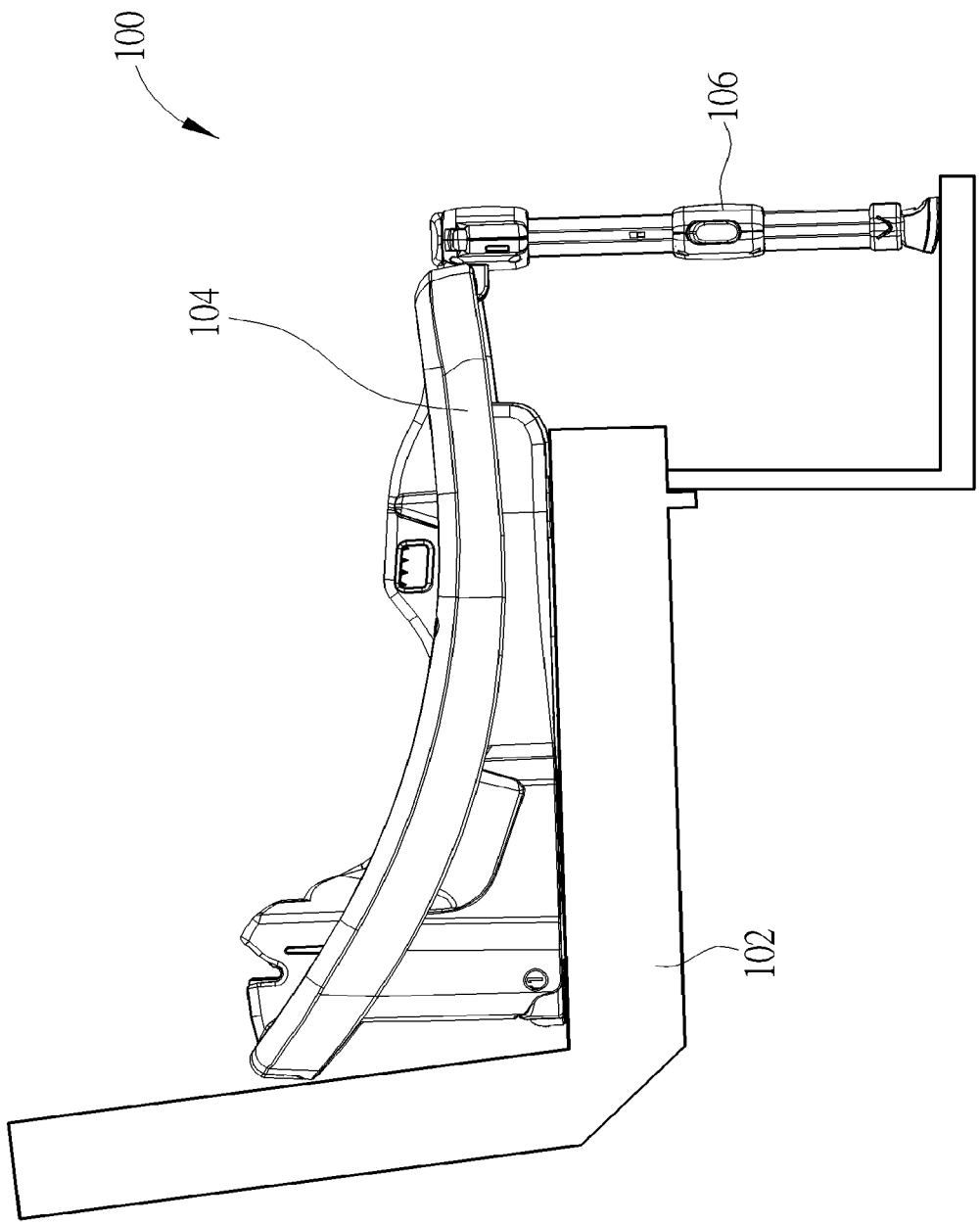
FIG. 1 is a diagram of the infant car seat and a vehicle seat according to an embodiment of the present invention.
Figure 2:
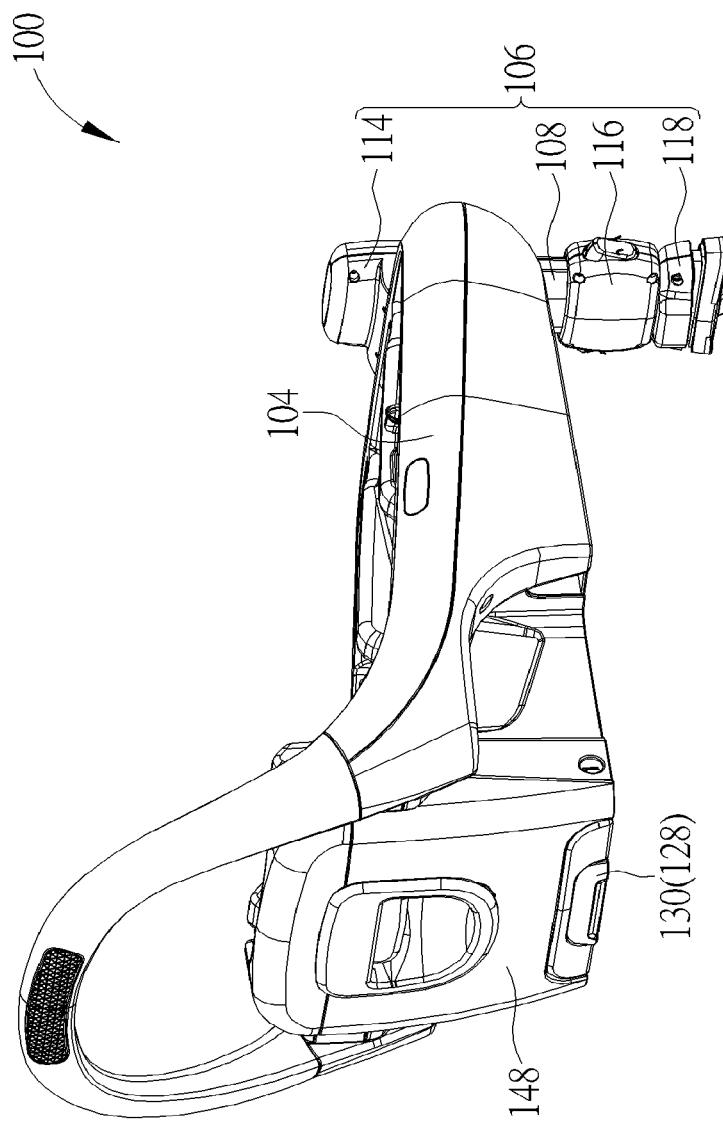
FIG. 2 is a diagram of the infant car seat in an operation mode according to the embodiment of the present invention.
Figure 3:
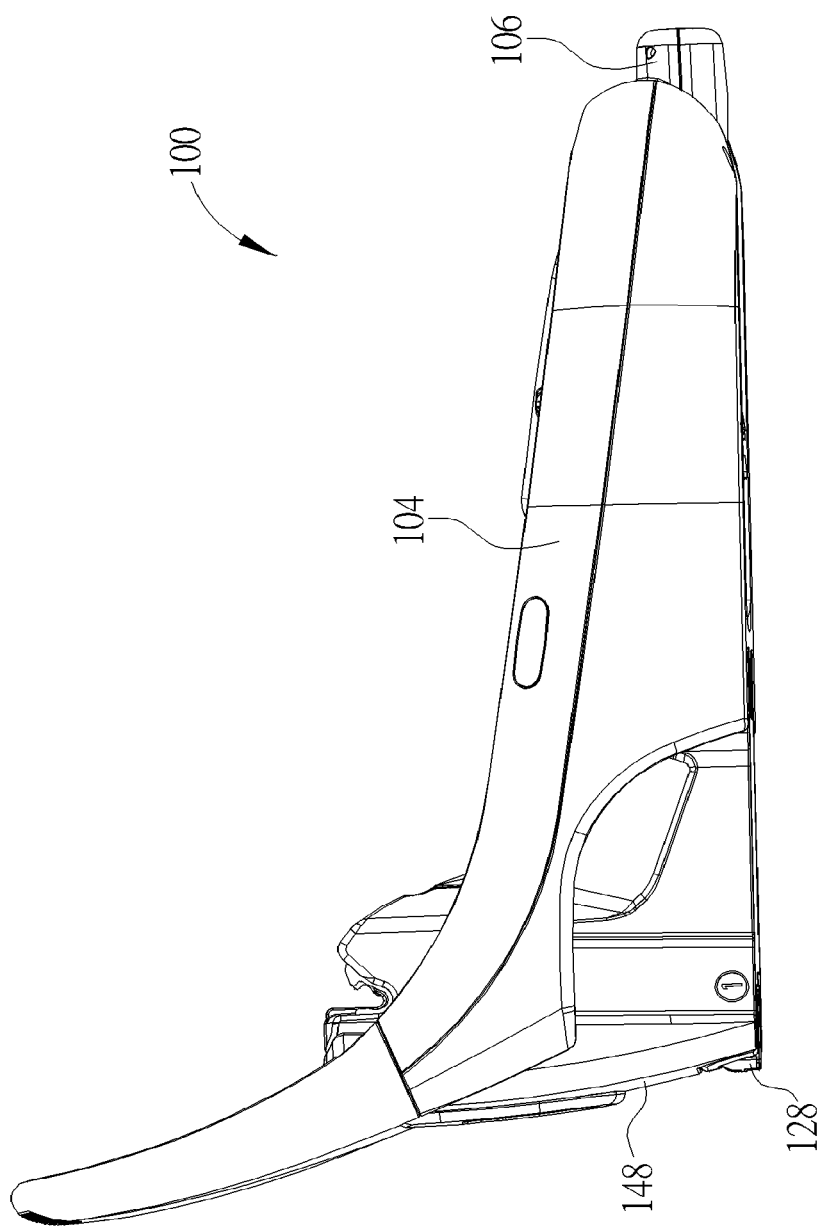
FIG. 3 is a diagram of the infant car seat in a storage mode according to the embodiment of the present invention.

Please refer to FIG. 1 to FIG. 3. FIG. 1 is a diagram of an infant car seat 100 and a vehicle seat 102 according to an embodiment of the present invention. FIG. 2 is a diagram of the infant car seat 100 in an operation mode according to the embodiment of the present invention. FIG. 3 is a diagram of the infant car seat 100 in a storage mode according to the embodiment of the present invention. The infant car seat 100 can be fixed to the vehicle seat 102 and has a safety seat for protecting the child. The infant car seat 100 can include a seat base 104 and a stability leg 106. The seat base 104 can be detachably fixed to the vehicle seat 102 via a latch mechanism, which is not shown in the figure. The stability leg 106 can be rotatably disposed under the seat base 104 for abutting against a vehicle floor. The stability leg 106 can be unfolded to switch the infant car seat 100 in the operation mode, as shown in FIG. 1 and FIG. 2; the stability leg 106 further can be folded to switch the infant car seat 100 in the storage mode, as shown in FIG. 3.

Figure 4:
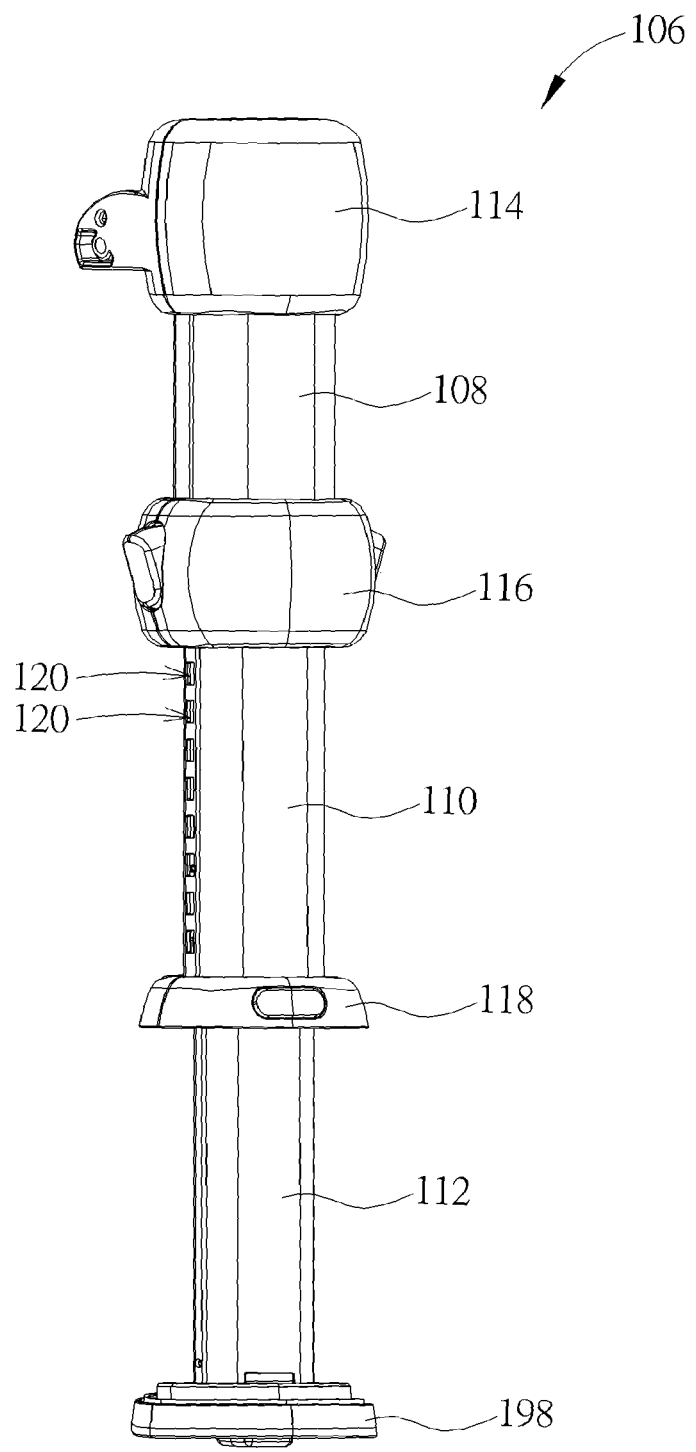
FIG. 4 is a diagram of the stability leg according to the embodiment of the present invention.

Please refer to FIG. 4. FIG. 4 is a diagram of the stability leg 106 according to the embodiment of the present invention. The stability leg 106 can include an upper leg tube 108, a middle leg tube 110, a lower leg tube 112, a rotary member 114, a first latch 116 and a second latch 118. The middle leg tube 110 can be slidably assembled with the upper leg tube 108, and have at least one hole 120. The lower leg tube 112 can be slidably assembled with the middle leg tube 110, and have at least one opening 122. The rotary member 114 can be assembled with the seat base 104 in a rotatable manner and affixed to a top of the upper leg tube 108. The first latch 116 can be disposed on a bottom of the upper leg tube 108. The second latch 118 can be disposed on a bottom of the middle leg tube 110.

Figure 5:
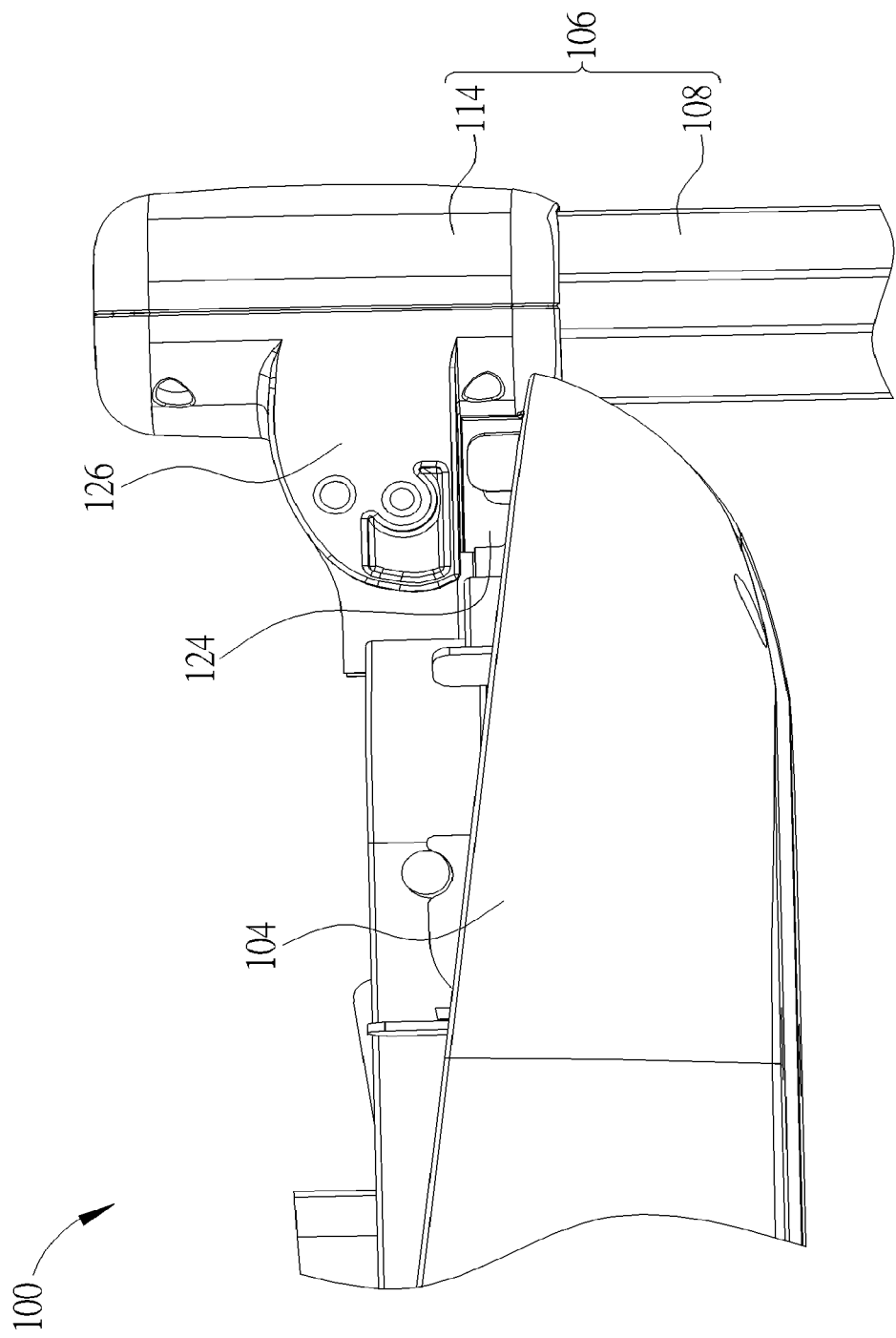
FIG. 5 is a diagram of a part of the infant car seat in the operation mode according to the embodiment of the present invention.
Figure 6:
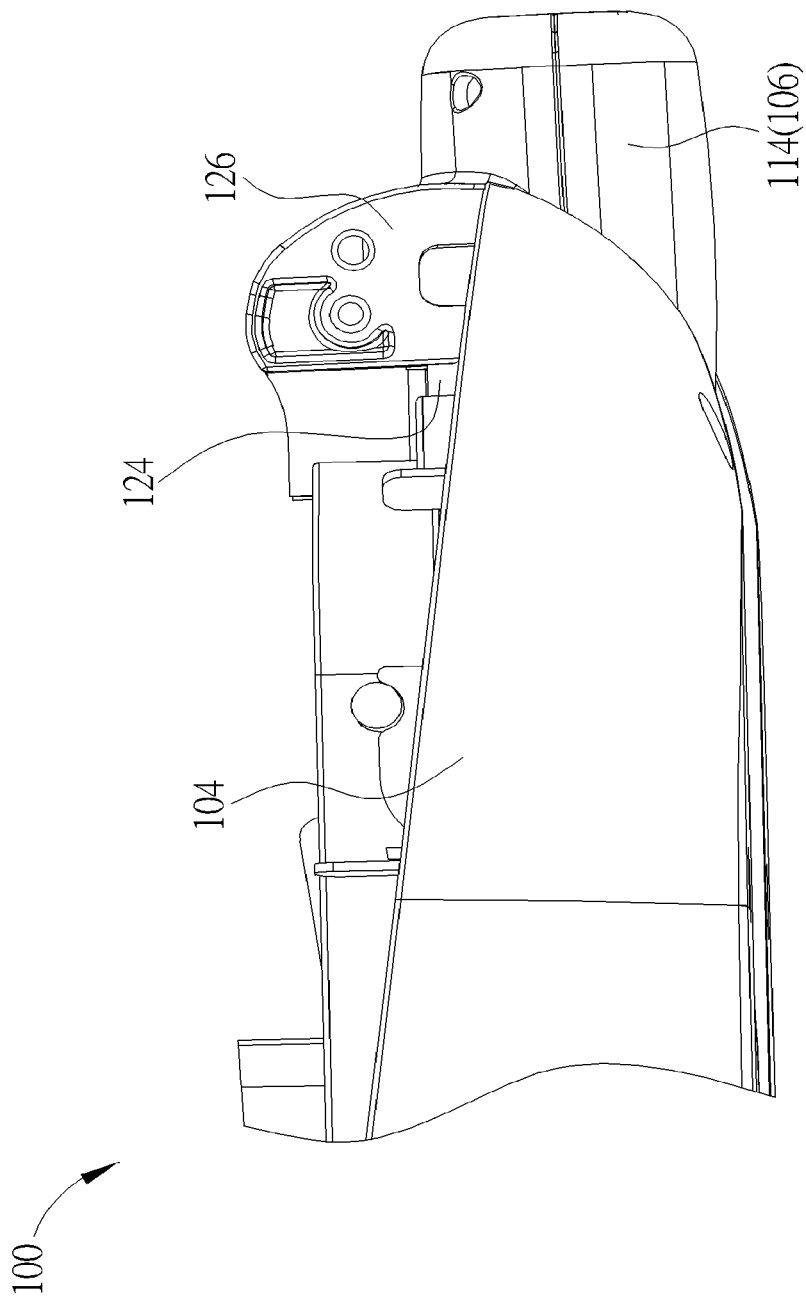
FIG. 6 is a diagram of the part of the infant car seat in the storage mode according to the embodiment of the present invention.

Please refer to FIG. 5 and FIG. 6. FIG. 5 is a diagram of a part of the infant car seat 100 in the operation mode according to the embodiment of the present invention. FIG. 6 is a diagram of the part of the infant car seat 100 in the storage mode according to the embodiment of the present invention. The seat base 104 can include a support frame 124, and the rotary member 114 of the stability leg 106 further can include a contacting portion 126. If the infant car seat 100 is in the operation mode, the contacting portion 126 can abut against the support frame 124 to constrain rotation of the stability leg 106 relative to the seat base 104, for keeping the stability leg 106 in an unfolded state. If the infant car seat 100 is in the storage mode, the contacting portion 126 can be separated from the support frame 124.

Figure 7:
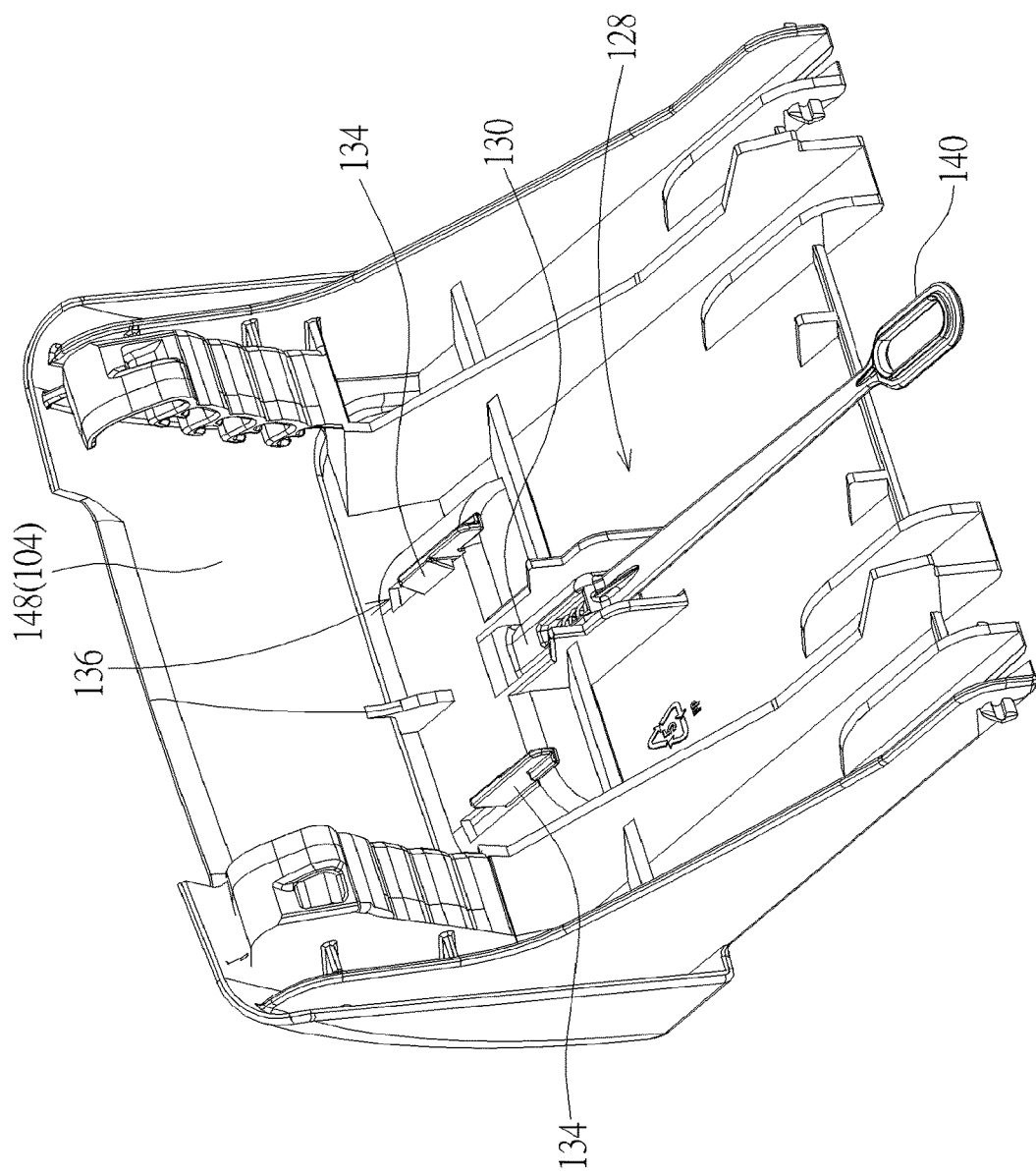
FIG. 7 is a diagram of the seat base in another view of the embodiment of the present invention.
Figure 8:
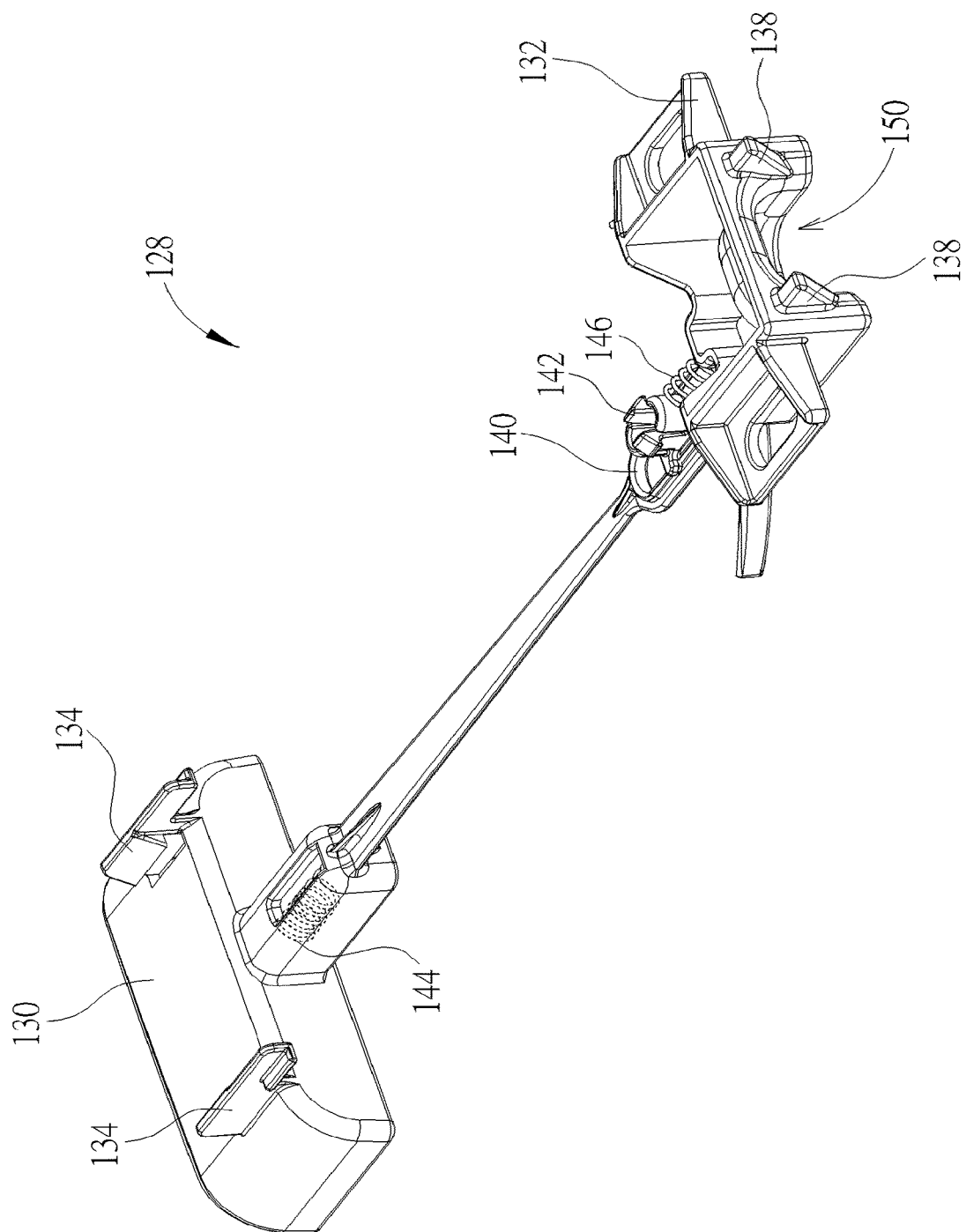
FIG. 8 is a diagram of the release actuator of the seat base of the embodiment of the present invention.

Please refer to FIG. 2, FIG. 7 and FIG. 8. FIG. 7 is a diagram of the seat base 104 in another view of the embodiment of the present invention. FIG. 8 is a diagram of a release actuator 128 of the seat base 104 of the embodiment of the present invention. The seat base 104 can utilize the release actuator 128 to lock the stability leg 106, so as to steady the stability leg 106 in the storage mode. The release actuator 128 further can be released manually to unlock the stability leg 106, and then the stability leg 106 can be switched to the operation mode. The release actuator 128 can include a handle portion 130, a locking portion 132 and a hook portion 134. The handle portion 130 can be connected to the locking portion 132 in a relatively movable manner. The hook portion 134 can be disposed on the handle portion 130 and slidably assembled with a slotted structure 136 of the seat base 104.

The locking portion 132 can be engaged with or disengaged from the stability leg 106 via an extended part 138. The handle portion 130 can be movably disposed on the seat base 104 due to assembly of the hook portion 134 and the slotted structure 136. If the external force is applied to the handle portion 130, the release actuator 128 can be moved outward to pull the locking portion 132, and the locking portion 132 can be separated from the stability leg 106 for disengagement. In addition, the handle portion 130 can include a first connection segment 140, and the locking portion 132 can include a second connection segment 142. The first connection segment 140 can be slidably connected to the second connection segment 142 by a pin of the second connection segment 142 moved inside a slot of the first connection segment 140. In a possible embodiment, the first connection segment 140 may have the pin moved inside the slot on the second connection segment 142.

The release actuator 128 can further include a first resilient component 144 disposed between the seat base 104 and the first connection segment 140 of the handle portion 130, and a second resilient component 146 disposed between the locking portion 132 and the seat base 104. The external force can be applied to the handle portion 130 for pulling out the release actuator 128; if the external force is removed, the resilient recovering force of the first resilient component 144 can move the handle portion 130 back into a reclined foot 148 the seat base 104. The external force further can be applied to a sunken structure 150 of the locking portion 132, for manually disengaging the locking portion 132 from the stability leg 106; if the external force is removed, the resilient recovering force of the second resilient component 146 can move the locking portion 132 back to the initial position, for engaging with the stability leg 106.

The reclined foot 148 can be rotatably disposed inside a housing of the seat base 104, and the release actuator 128 can be movably disposed inside the reclined foot 148. If the reclined foot 148 is pulled out, a height of the infant car seat 100 can be adjusted, and the first resilient component 144 can be deformed to adjust assembly of the first connection segment 140 and the second connection segment 142, for allowing motion of the handle portion 132 due to rotation of the reclined foot 148, and keeping the locking portion 132 stably engaged with the stability leg 106.

Figure 9:
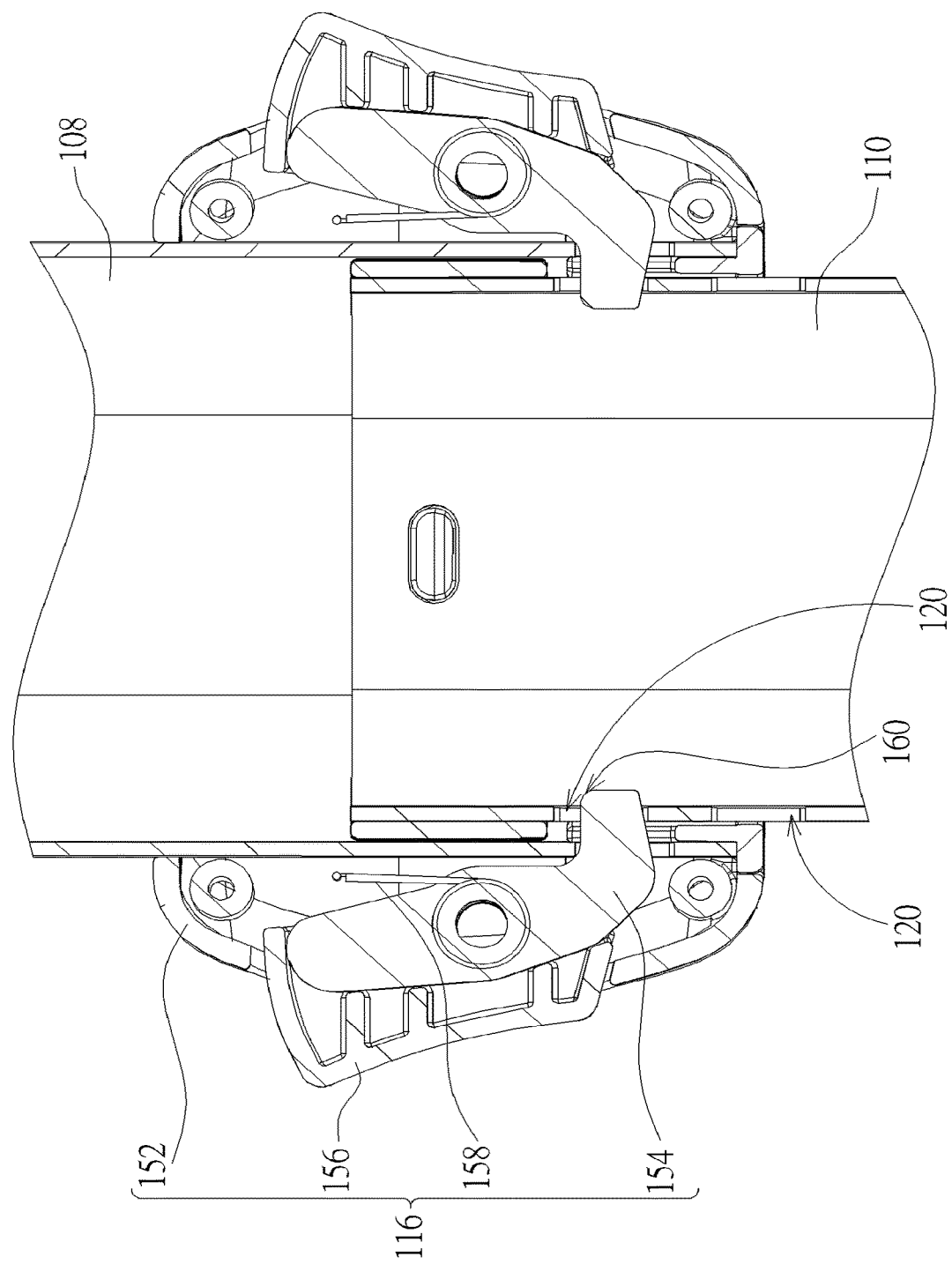
FIG. 9 is a diagram of the upper leg tube, the middle leg tube and the first latch in the locking mode according to the embodiment of the present invention.
Figure 10:
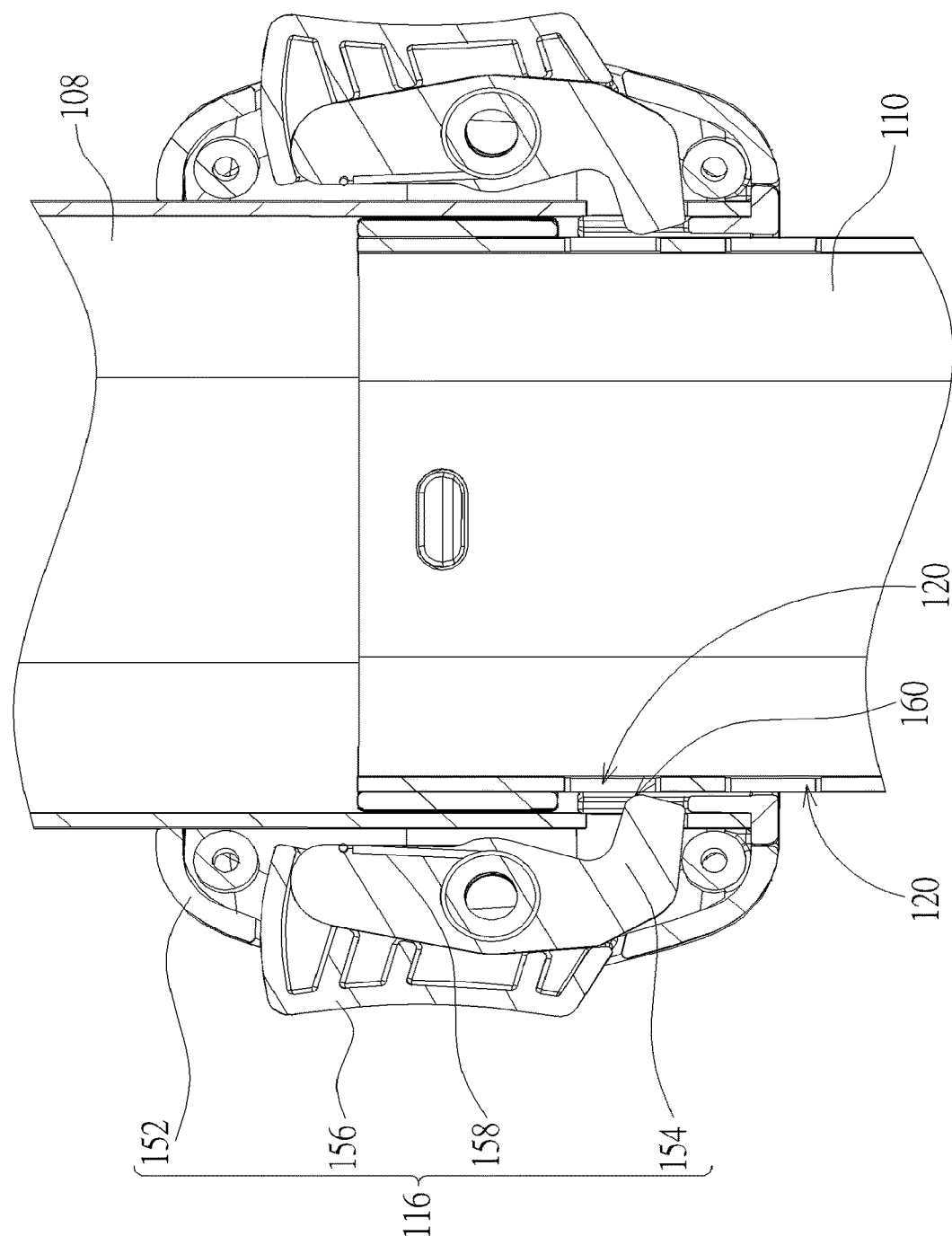
FIG. 10 is a diagram of the upper leg tube, the middle leg tube and the first latch in the unlocking mode according to the embodiment of the present invention.

Please refer to FIG. 4, FIG. 9 and FIG. 10. FIG. 9 is a diagram of the upper leg tube 108, the middle leg tube 110 and the first latch 116 in the locking mode according to the embodiment of the present invention. FIG. 10 is a diagram of the upper leg tube 108, the middle leg tube 110 and the first latch 116 in the unlocking mode according to the embodiment of the present invention. The first latch 116 can include a first housing 152, a first lock 154, a first button 156, and a first recovering component 158. The first button 156 can be movably disposed inside the first housing 152. The first lock 154 can be affixed to the first button 156 and movably disposed inside the first housing 152. The first recovering component 158 can be disposed between the first housing 152 and the first button 156, or between the first housing 152 and the first lock 154.

The external force can be applied to the first button 156, to move the first button 156 relative to the first housing 152. Motion of the first button 156 can move and disengage the first lock 154 from the hole 120 on the middle leg tube 110, and the upper leg tube 108 can be freely moved relative to the middle leg tube 110, as the conditions shown in FIG. 9 to FIG. 10. If the external force applied to the first button 156 is removed, the resilient recovering force of the first recovering component 158 can move the first lock 154 and the first button 156 back to the initial position for constraining the movement between the upper leg tube 108 and the middle leg tube 110, such as inserting the first lock 154 into the hole 120 on the middle leg tube 110, as conditions shown in FIG. 10 to FIG. 9.

In the embodiment, the first button 156 can be disposed inside the first housing 152 in a rotatable manner, and the first lock 154 may be disposed inside the first housing 152 in the rotatable manner or in a shiftable manner. In other possible embodiment, the first button 156 may be disposed inside the first housing 152 in the shiftable manner, and the first lock 154 can be disposed inside the first housing 152 in the rotatable manner or in the shiftable manner. Besides, an inclined guiding structure 160 may be optionally disposed on a front end of the first lock 154; then, the middle leg tube 110 can be pulled down to easily disengage the first lock 154 from the hole 120 on the middle leg tube 110 due to design of the inclined guiding structure 160. Disengagement of the first lock 154 and the middle leg tube 110 further can be accomplished by pressing the first button 156 to guide motion of the first lock 154.

Figure 11:
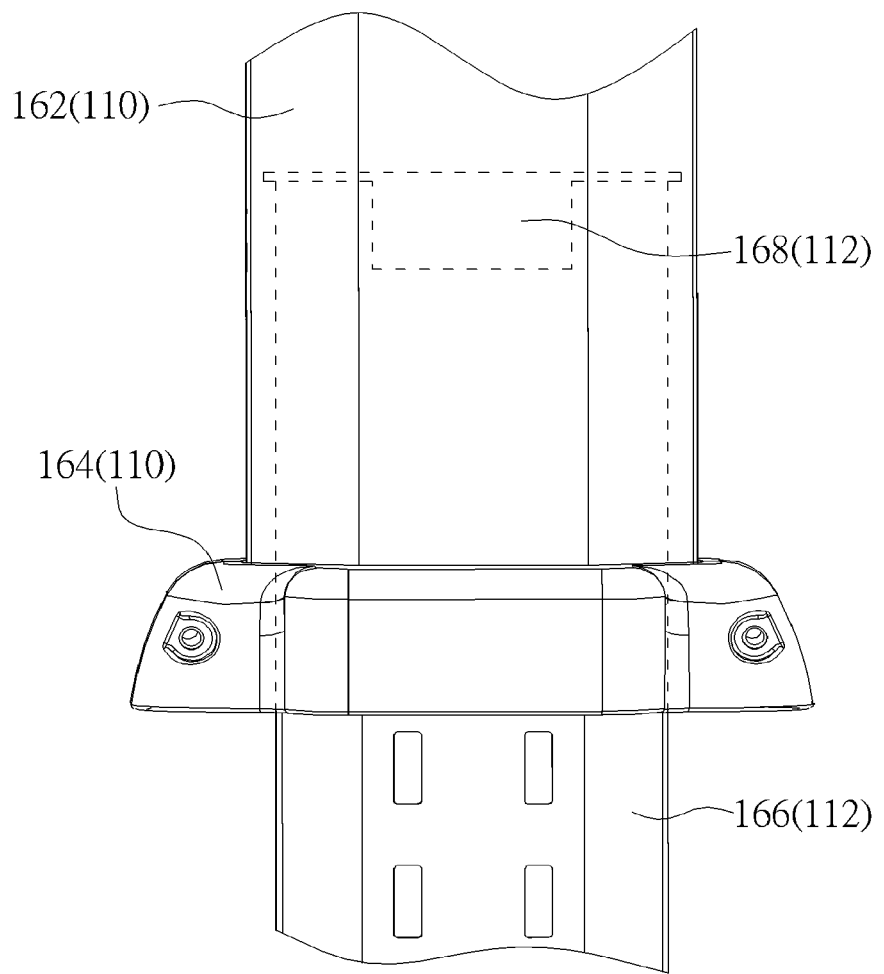
FIG. 11 is a diagram of the middle leg tube and the lower leg tube in a shortened mode according to the embodiment of the present invention.
Figure 12:
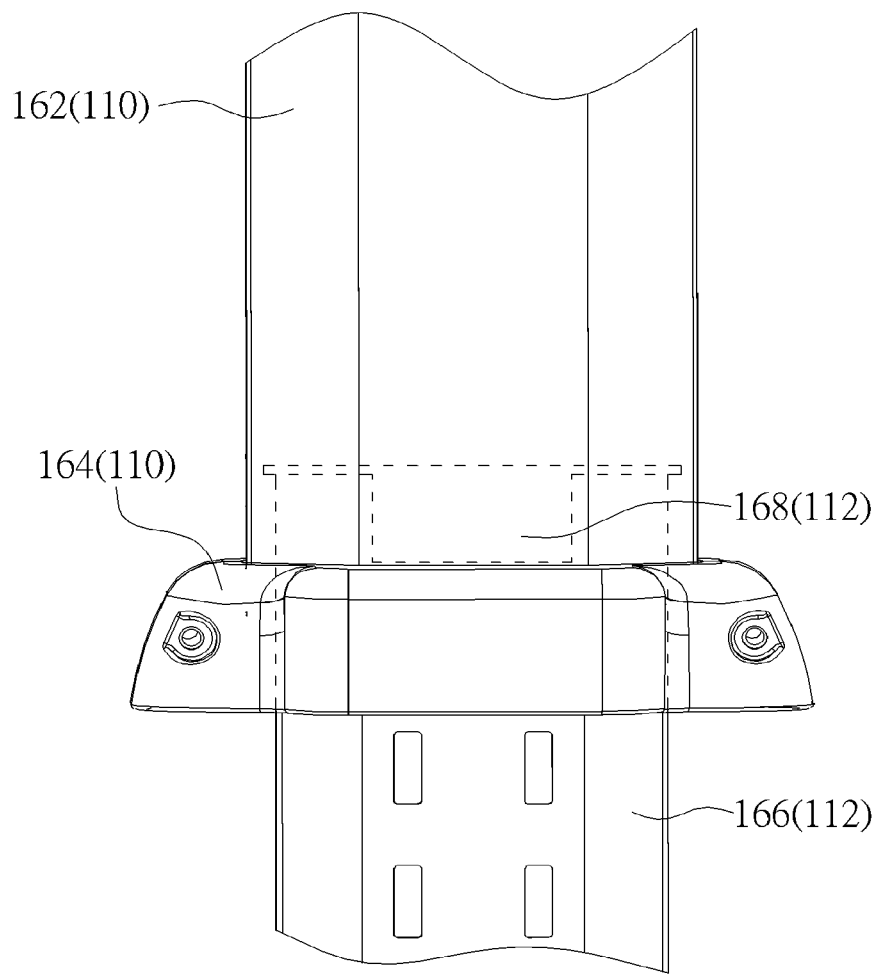
FIG. 12 is a diagram of the middle leg tube and the lower leg tube in an extended mode according to the embodiment of the present invention.
Figure 13:
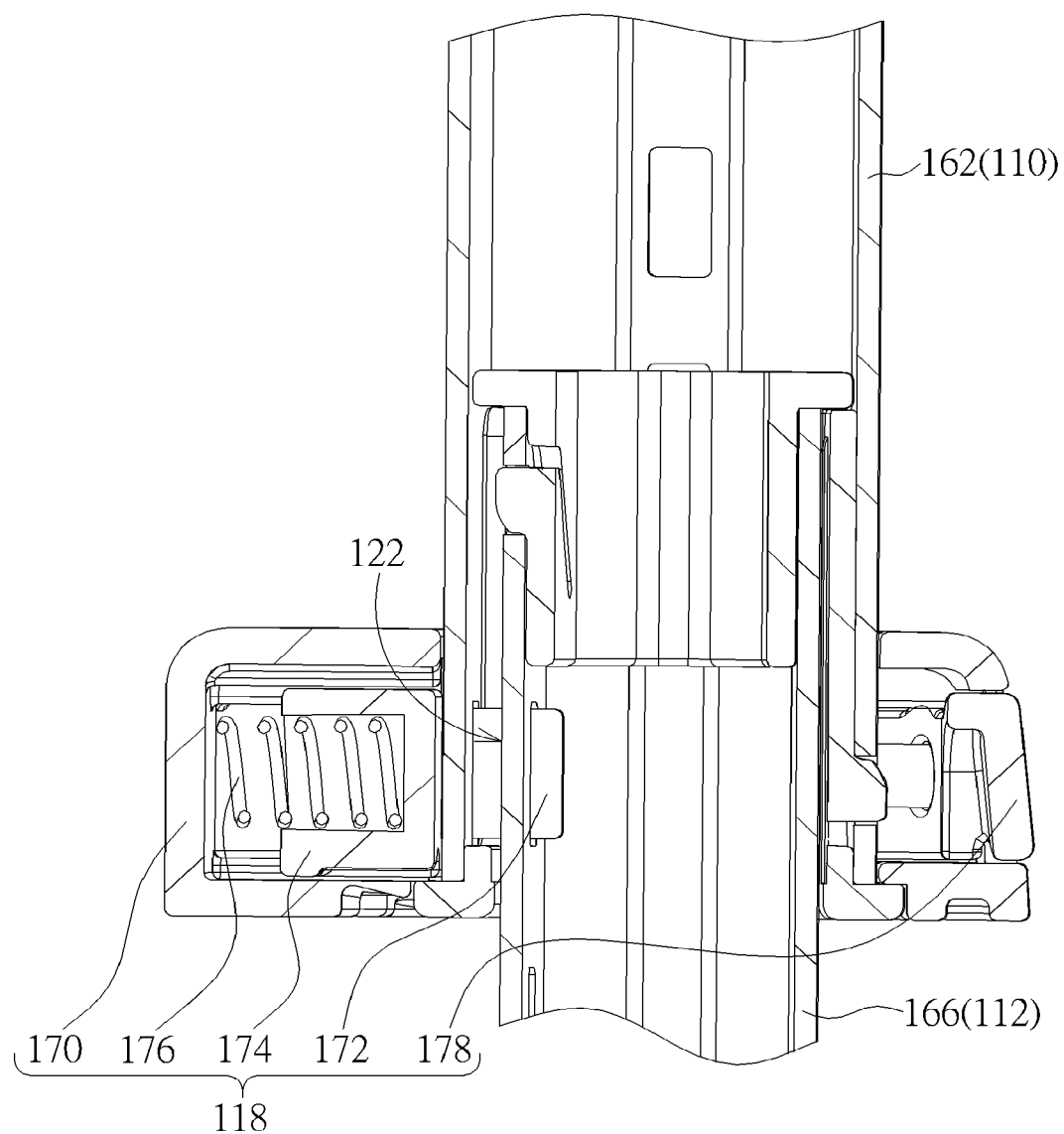
FIG. 13 is a diagram of the middle leg tube, the lower leg tube and the second latch in the lock mode according to the embodiment of the present invention.
Figure 14:
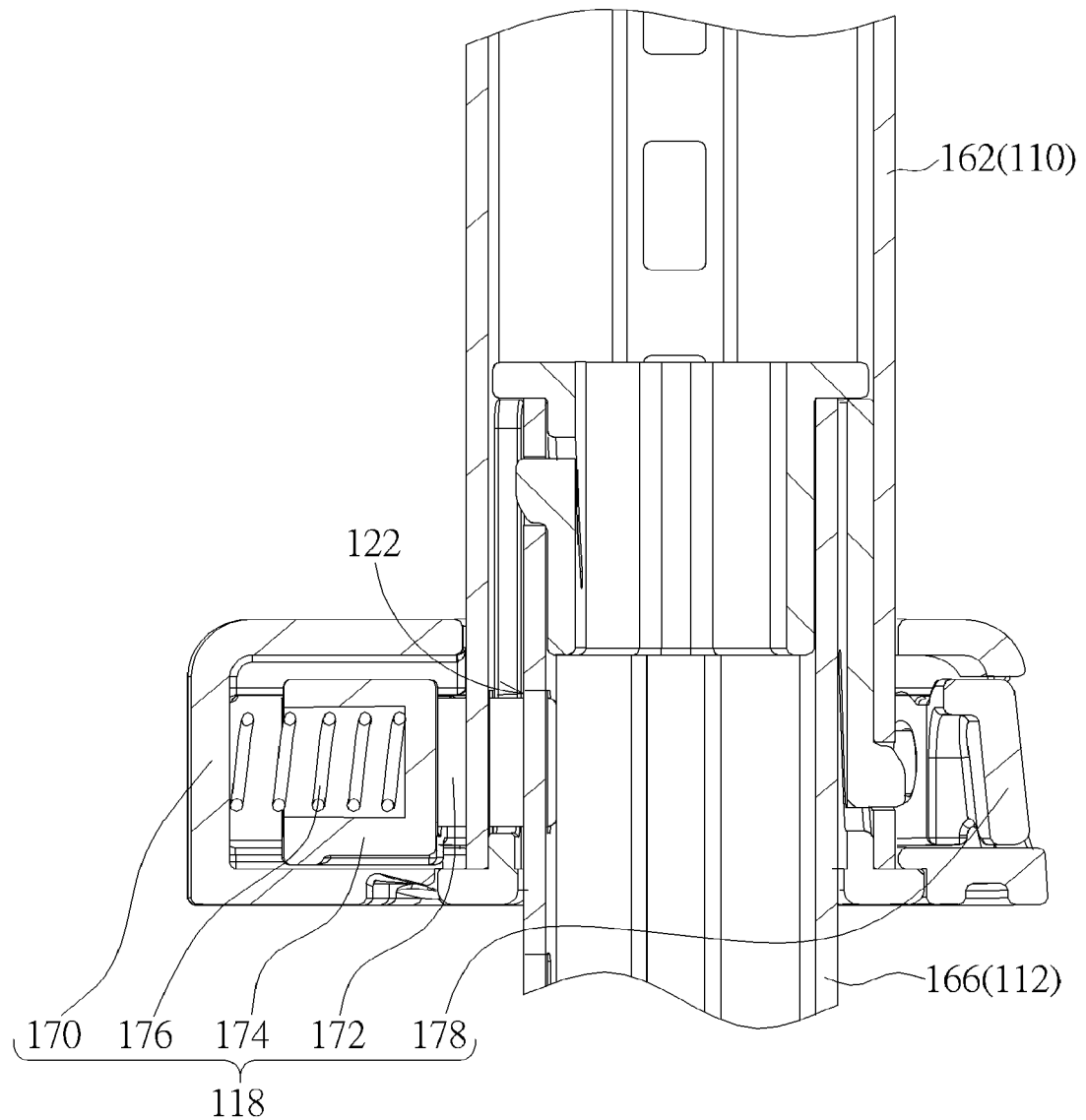
FIG. 14 is a diagram of the middle leg tube, the lower leg tube and the second latch in the unlock mode according to the embodiment of the present invention.

Please refer to FIG. 4 and FIG. 11 to FIG. 14. FIG. 11 is a diagram of the middle leg tube 110 and the lower leg tube 112 in a shortened mode according to the embodiment of the present invention. FIG. 12 is a diagram of the middle leg tube 110 and the lower leg tube 112 in an extended mode according to the embodiment of the present invention. FIG. 13 is a diagram of the middle leg tube 110, the lower leg tube 112 and the second latch 118 in the lock mode according to the embodiment of the present invention. FIG. 14 is a diagram of the middle leg tube 110, the lower leg tube 112 and the second latch 118 in the unlock mode according to the embodiment of the present invention.

The middle leg tube 110 can further include a middle tube body 162 and a first obstructer 164. The first obstructer 164 can be disposed on a bottom of the middle tube body 162, and the lower leg tube 112 can be moved relative to the first obstructer 164. The lower leg tube 112 can further include a lower tube body 166 and a second obstructer 168. The second obstructer 168 can be disposed on a top of the lower tube body 166 and accommodated inside the middle leg tube 110. When the lower leg tube 112 is moved relative to the middle leg tube 110, the first obstructer 164 can contact against the second obstructer 168 to constrain relative motion between the middle leg tube 110 and the lower leg tube 112, as shown in FIG. 11 and FIG. 12.

The second latch 118 can include a second housing 170, a second lock 172, a slider 174, a second recovering component 176 and a second button 178. The slider 174 can be slidably disposed inside the second housing 170. The second lock 172 can be affixed to the slider 174 and slidably disposed inside the second housing 170. The second button 178 can be movably disposed on the second housing 170, and may be exposed for being pressed. The second recovering component 176 can be disposed between the second housing 170 and the slider 174, or between the second housing 170 and the second lock 172. In a possible embodiment, the second recovering component 176 may be disposed between the second button 178 and the middle leg tube 110.

If the external force is applied to the second button 178, the second button 178 can push the second lock 172 and the slider 174 to be moved relative to the second housing 170 inward. The second lock 172 can be disengaged from the opening 122, and therefore the lower leg tube 112 can be moved relative to the middle leg tube 110. If the external force applied to the second button 178 is removed, the resilient recovering force of the second recovering component 176 can move the second lock 172 and the slider 174 relative to the second housing 170 outward, and the second lock 172 can be engaged with the opening 122 for constraining a movement between the middle leg tube 110 and the lower leg tube 112. As shown in FIG. 14, the second lock 172 may slidably abut against a wall of the lower leg tube 112 when the second latch 118 is disengaged from the opening 122 on the lower leg tube 112 and the lower leg tube 112 is moved relative to the middle leg tube 110.

Figure 15:
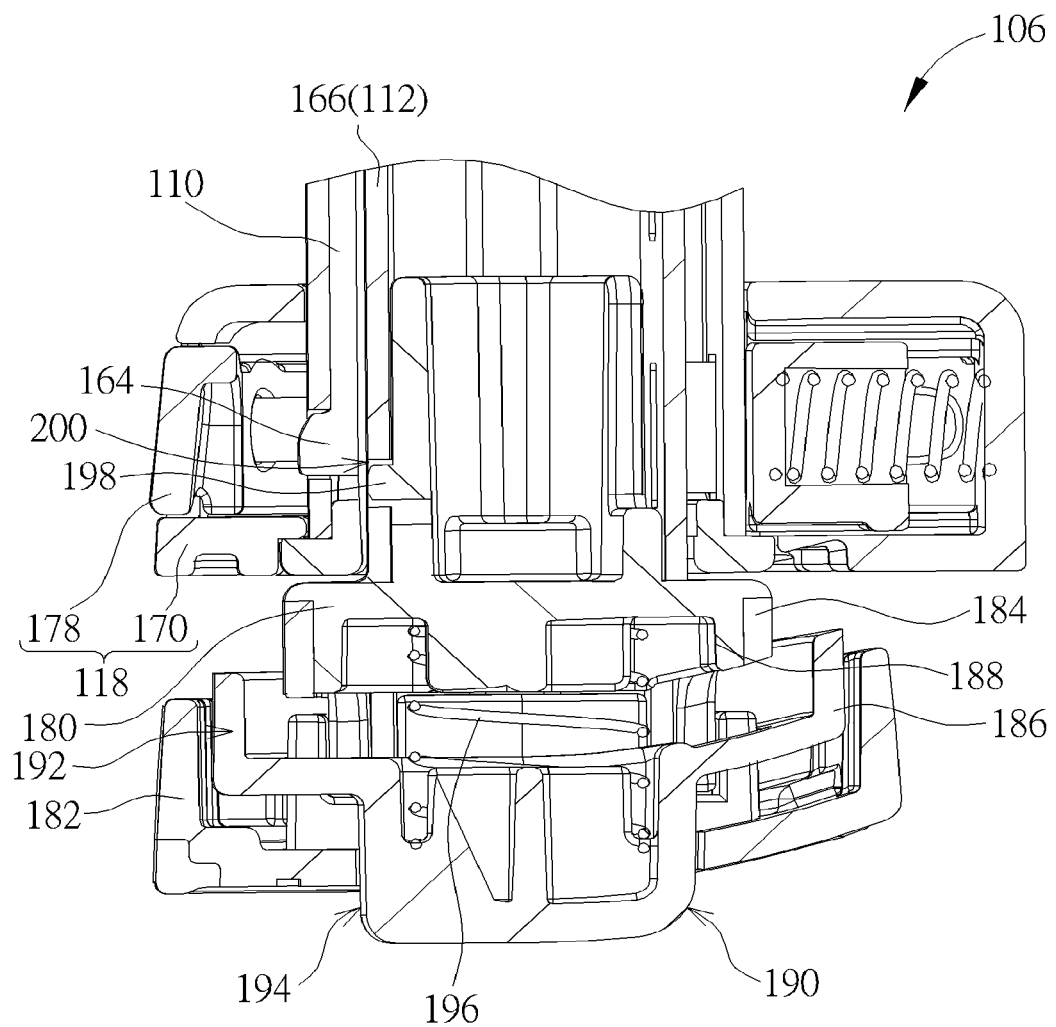
FIG. 15 is a section view of a bottom of the stability leg according to the embodiment of the present invention.
Figure 16:
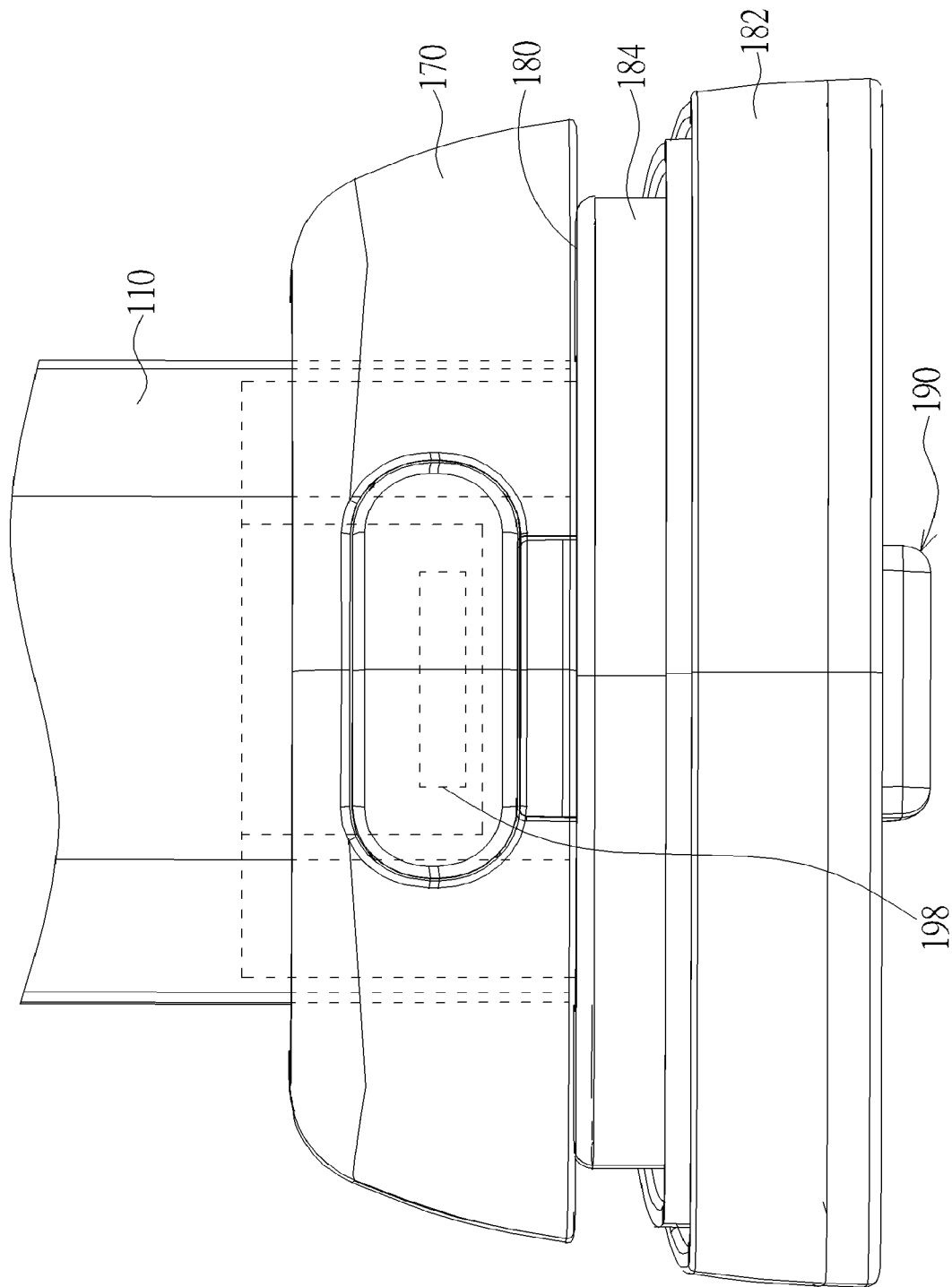
FIG. 16 is a diagram of a part of the bottom of the stability leg according to the embodiment of the present invention.
Figure 17:
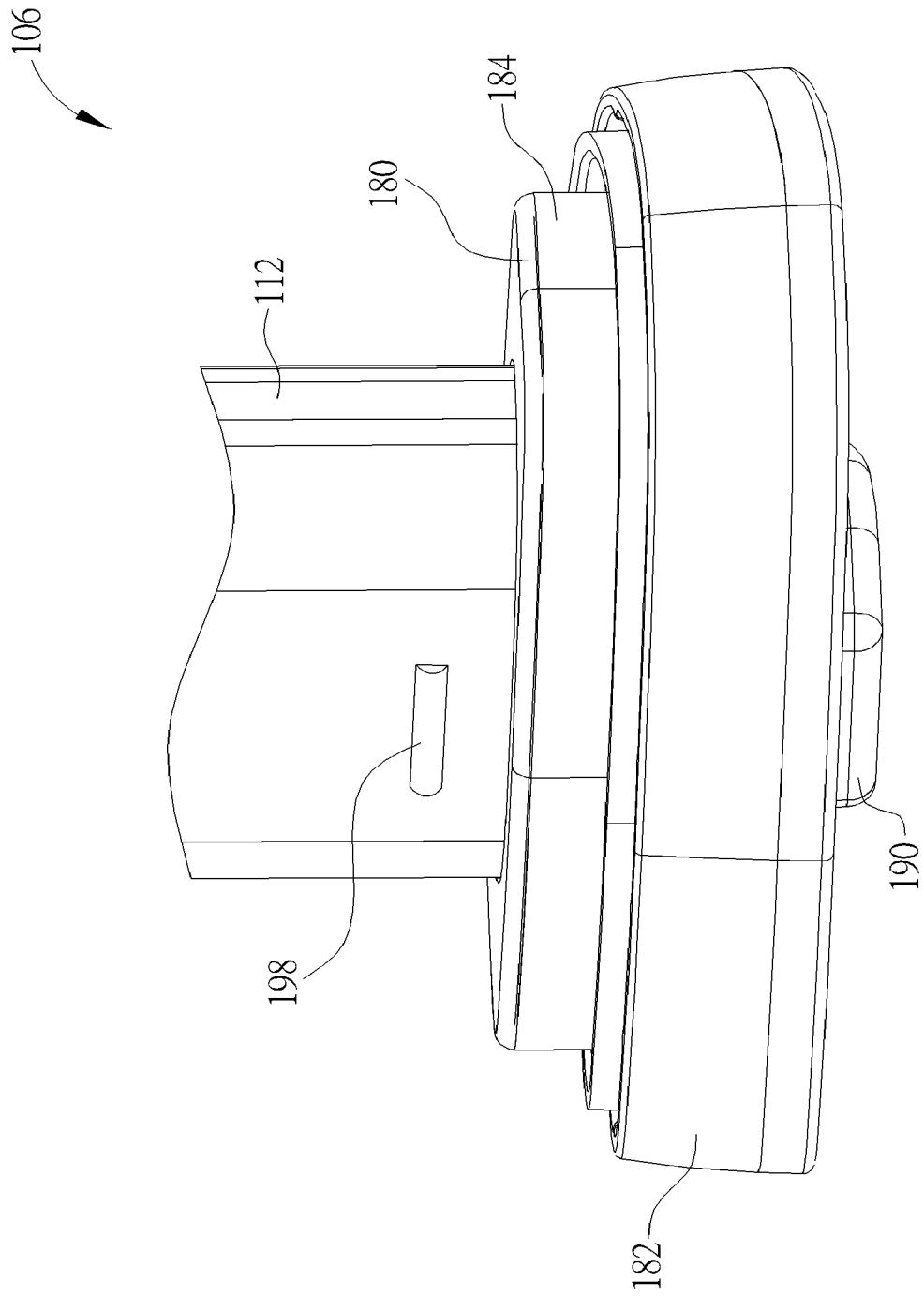
FIG. 17 is a diagram of the bottom of the stability leg in a non-contact mode according to the embodiment of the present invention.
Figure 18:
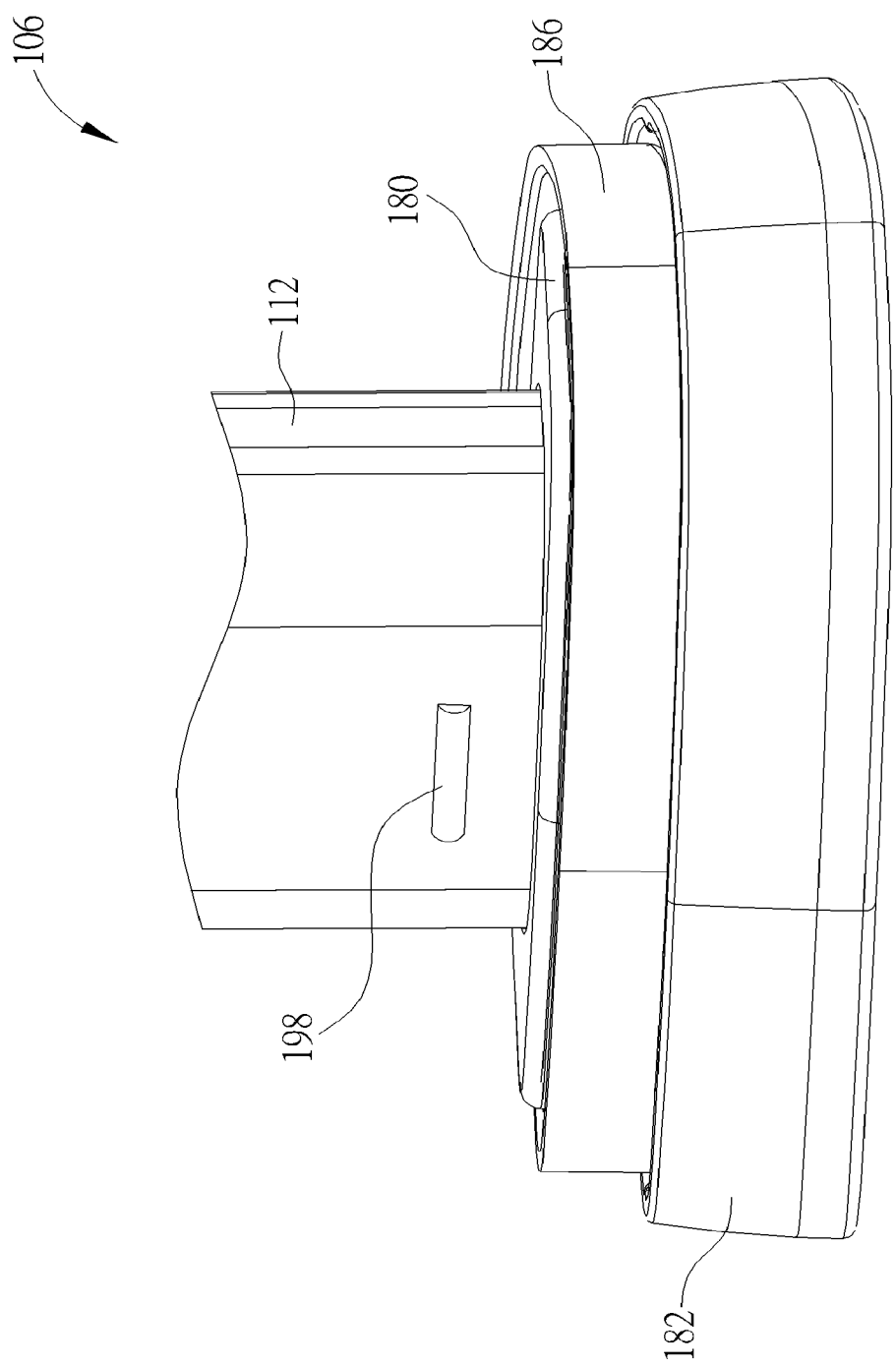
FIG. 18 is a diagram of the bottom of the stability leg in a contact mode according to the embodiment of the present invention.

Please refer to FIG. 4 and FIG. 15 to FIG. 18. FIG. 15 is a section view of a bottom of the stability leg 106 according to the embodiment of the present invention. FIG. 16 is a diagram of a part of the bottom of the stability leg 106 according to the embodiment of the present invention. FIG. 17 is a diagram of the bottom of the stability leg 106 in a non-contact mode according to the embodiment of the present invention. FIG. 18 is a diagram of the bottom of the stability leg 106 in a contact mode according to the embodiment of the present invention.

The stability leg 106 can include a first foot housing 180, a second foot housing 182, a first indication mark 184 and a second indication mark 186. The first foot housing 180 can be disposed on a bottom of the lower leg tube 112. The first foot housing 180 can have an encirclement portion 188 whereon the first indication mark 184 is disposed. The second foot housing 182 can be connected with but spaced from the first foot housing 180, so that the encirclement portion 188 can be exposed via a gap between the first foot housing 180 and the second foot housing 182. The second indication mark 186 can be movably disposed inside the second foot housing 182.

The second indication mark 186 can have a first end 190 and a second end 192 opposite to each other; for example, the first end 190 may be a bottom side of the second indication mark 186, and the second end 192 may be a top side of the second indication mark 186. If the stability leg 106 is in the non-contact mode, the second end 192 can be hidden inside the second foot housing 182, and the first end 190 can protrude from at least one cavity 194 formed on a bottom of the second foot housing 182. If the stability leg 106 is in the contact mode, the first end 190 can be pushed into the bottom of the second foot housing 182, such as putting the stability leg 106 on the vehicle floor, and the second end 192 can reach out the second foot housing 182 to be exposed via the foresaid gap.

The first indication mark 184 may be painted by red pigment, and the second indication mark 186 may be painted by green pigment. When the stability leg 106 is suspended and does not abut against the vehicle floor, the first indication mark 184 is exposed because the second indication mark 186 can be hidden inside the second foot housing 182, so the stability leg 106 can be easily observed in the non-contact mode; the infant car seat 100 is determined as being in the storage mode, or the infant car seat 100 is not switched into the operation mode correctly. When the stability leg 106 solidly abut against the vehicle floor, the second indication mark 186 can be lifted to surround and shelter the first indication mark 184, so the second indication mark 186 is exposed; the stability leg 106 can be observed in the contact mode, which means the infant car seat 100 is correctly switched into the operation mode.

The stability leg 106 may optionally dispose an elastic component 196 between the second indication mark 186 and the first foot housing 180. If the stability leg 106 is lifted and spaced from the vehicle floor, a resilient recovering force of the elastic component 196 can move second indication mark 186 toward the bottom of the second foot housing 182, and the first end 190 of the second indication mark 186 can protrude from the cavity 194 under the second foot housing 182. In addition, the first foot housing 180 may include a flexible protrusion 198. The flexible protrusion 198 can protrude from an aperture 200 on the lower leg tube 112, and used to engage with the first obstructer 164 or an inner wall of the middle leg tube 110, so as to constrain the movement between the middle leg tube 110 and the lower leg tube 112 when the stability leg 106 is in the storage mode.

In the embodiment, the second indication mark 186 can be disposed inside the second foot housing 182 in a slidable manner. The second indication mark 186 may have an engaging portion slidably assembled with an engaged portion of the second foot housing 182. Types of the engaging portion and the engaged portion are not shown in the figures and depend on a design demand. In other possible embodiment, the second indication mark 186 may be disposed inside the second foot housing 182 in a rotatable manner, which is not shown in the figures and depends on the design demand.

As shown in FIG. 4 and FIG. 9 to FIG. 14, an amount of the hole 120 is plural, and a plurality of holes 120 is highly concentrated on a side of the middle leg tube 110, so that the first latch 116 can be used as fine adjustment. The middle leg tube 110 has a few opening 122 and the second latch 118 is disposed on the bottom of the middle leg tube 110, and thus the second latch 118 can be used as gross adjustment. In other possible embodiment, if an amount of the opening 122 is greater than the amount of the hole 120, and the second latch 118 may be connected to the lower leg tube 112 and slidably assembled with the middle leg tube 110, the second latch 118 can be used as the fine adjustment and the first latch 116 can be used as the gross adjustment.

In the embodiment of the present invention, the stability leg has the upper leg tube, the middle leg tube and the lower leg tube slidably assembled with each other. The first latch is used to constrain the relative movement between the upper leg tube and the middle leg tube. The second latch is used to constrain the relative movement between the middle leg tube and the lower leg tube. The gross adjustment of the stability leg can lock the middle leg tube in accordance with the hole on the middle leg tube; the fine adjustment of the stability leg can lock the lower leg tube in the lower position via the opening on the lower leg tube, and further lock the lower leg tube in the upper position via the flexible protrusion of the foot housing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An infant car seat, comprising:
   a seat base; and
   a stability leg disposed under the seat base, the stability leg comprising:
   at least one leg tube;
   an encircling mark disposed on the at least one leg tube; and
   an indication member indicating that the stability leg is in a contact mode, where the stability leg abuts against a floor, or in a non-contact mode, where the stability leg is spaced from the floor, wherein when the stability leg is in the contact mode, the indication member shelters the encircling mark, and wherein in the non-contact mode, the indication member exposes the encircling mark.

2. The infant car seat of claim 1, wherein the encircling mark is fixed to a bottom of the at least one leg tube.

3. The infant car seat of claim 1, wherein the indication member is positioned at least partially below the encircling mark in the non-contact mode.

4. The infant car seat of claim 1, wherein the indication member is slidable relative to the encircling mark.

5. The infant car seat of claim 1, wherein the stability leg further comprises an elastic component operably disposed between the encircling mark and the indication member, wherein the elastic component is configured to bias the indication member toward the non-contact mode.

6. The infant car seat of claim 1, wherein the top of the at least one leg tube is spaced from the bottom of the at least one leg tube in a leg direction, wherein when the contact indicator is in the non-contact mode, the encircling mark is visible 360° about the leg direction.

7. The infant car seat of claim 6, wherein the indication member surrounds the encircling mark 360° about the leg direction in the contact mode.

8. An infant car seat, comprising:
   a seat base; and
   a stability leg disposed under the seat base, the stability leg is switchable between a contact mode, in which the stability leg abuts against a floor, and a non-contact mode, in which the stability leg is spaced from the floor, the stability leg comprising:
   at least one leg member;
   an encircling mark disposed on the at least one leg member; and
   an indication member configured to shelter the encircling mark in the contact mode, and further configured to expose the encircling mark in the non-contact mode.

9. The infant car seat of claim 8, wherein the encircling mark is fixed to a bottom of the at least one leg member.

10. The infant car seat of claim 8, wherein the indication member is positioned at least partially below the encircling mark in the non-contact mode.

11. The infant car seat of claim 8, wherein the indication member is slidable relative to the encircling mark.

12. The infant car seat of claim 8, wherein the stability leg further comprises an elastic component operably disposed between the encircling mark and the indication member, wherein the elastic component is configured to bias the indication member toward the non-contact mode.

13. The infant car seat of claim 8, wherein the top of the at least one leg member is spaced from the bottom of the at least one leg member in a leg direction, wherein when the contact indicator is in the non-contact mode, the encircling mark is visible 360° about the leg direction.

14. The infant car seat of claim 13, wherein the indication member surrounds the encircling mark 360° about the leg direction in the contact mode.

\* \* \* \* \*